Figure 3:
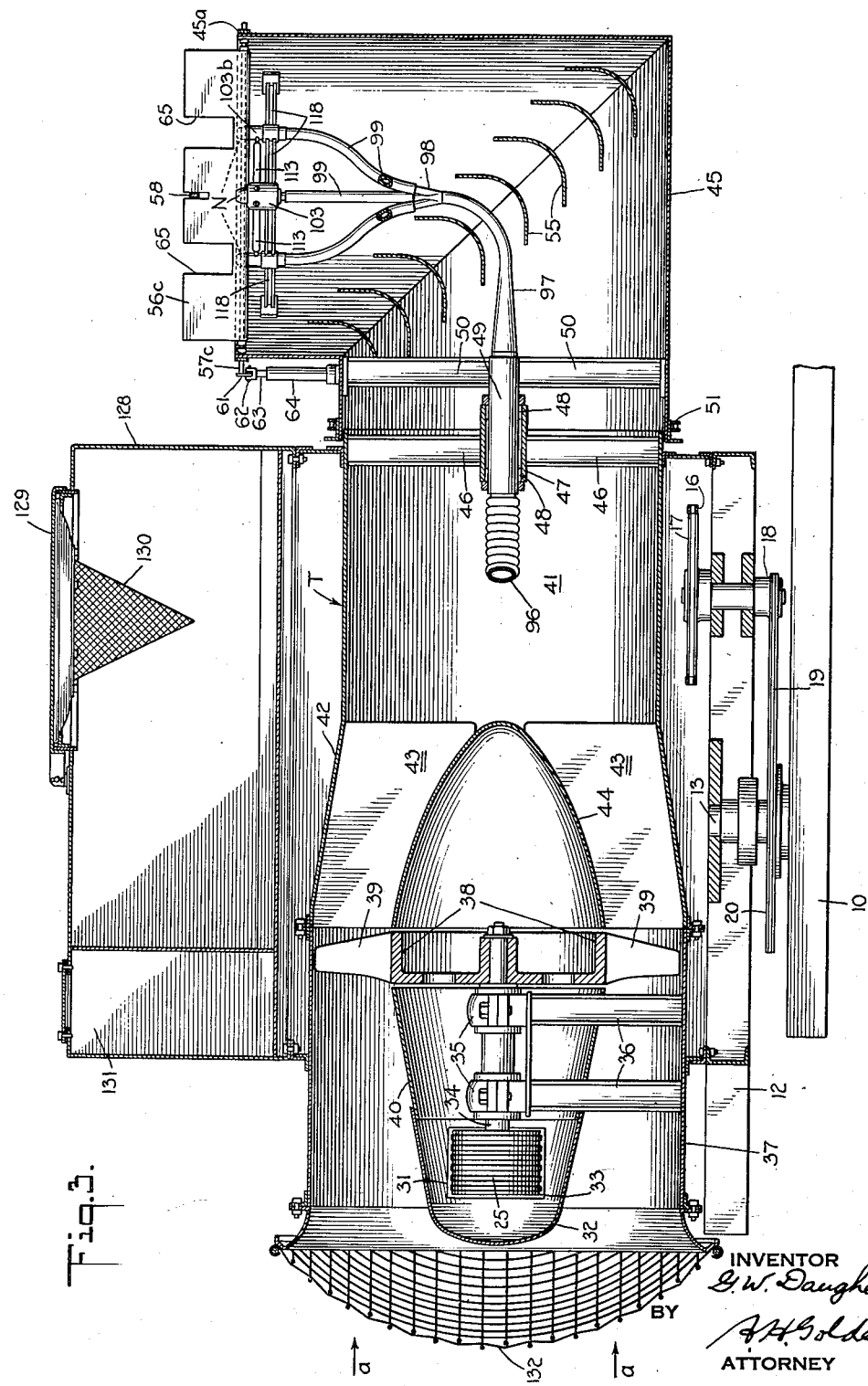

Feb. 2, 1954     G. W. DAUGHERTY     2,667,717
SPRAYING AND DUSTING MACHINE
Filed May 21, 1948     5 Sheets-Sheet 1
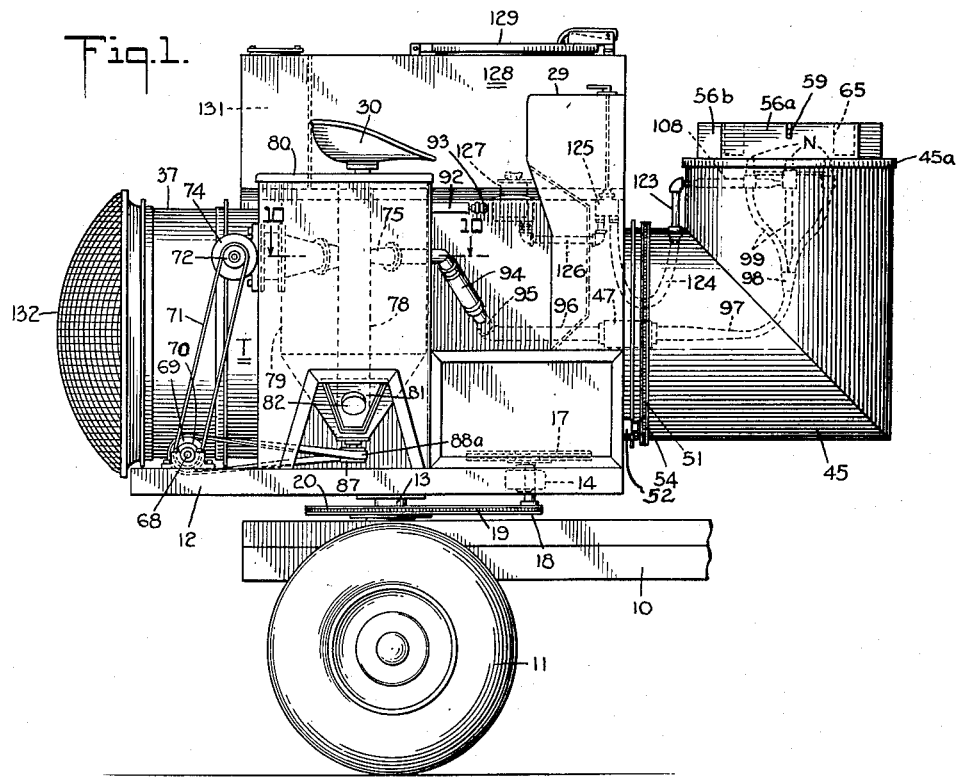
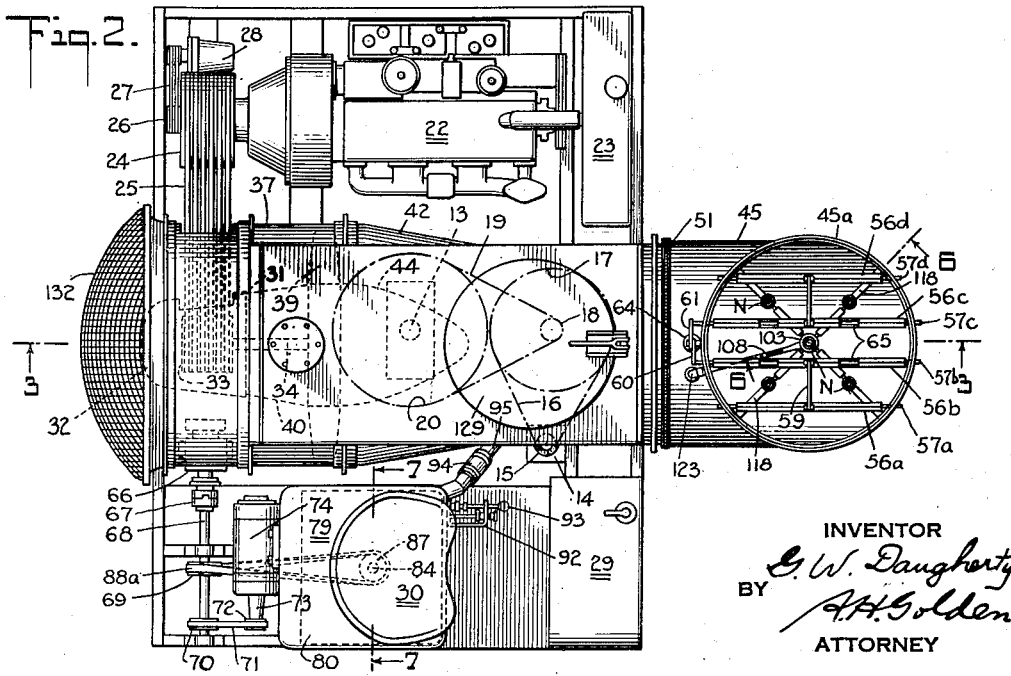
INVENTOR
G. W. Daugherty
BY
A. H. Golden
ATTORNEY Feb. 2, 1954 G. W. DAUGHERTY 2,667,717
SPRAYING AND DUSTING MACHINE
Filed May 21, 1948 5 Sheets-Sheet 2

INVENTOR
G. W. Daugherty
BY
A. H. Golden
ATTORNEY

Feb. 2, 1954 G. W. DAUGHERTY 2,667,717
SPRAYING AND DUSTING MACHINE
Filed May 21, 1948 5 Sheets-Sheet 3

INVENTOR
G. W. Daugherty
BY
A. H. Golden
ATTORNEY

Feb. 2, 1954  G. W. DAUGHERTY  2,667,717
SPRAYING AND DUSTING MACHINE
Filed May 21, 1948  5 Sheets-Sheet 4
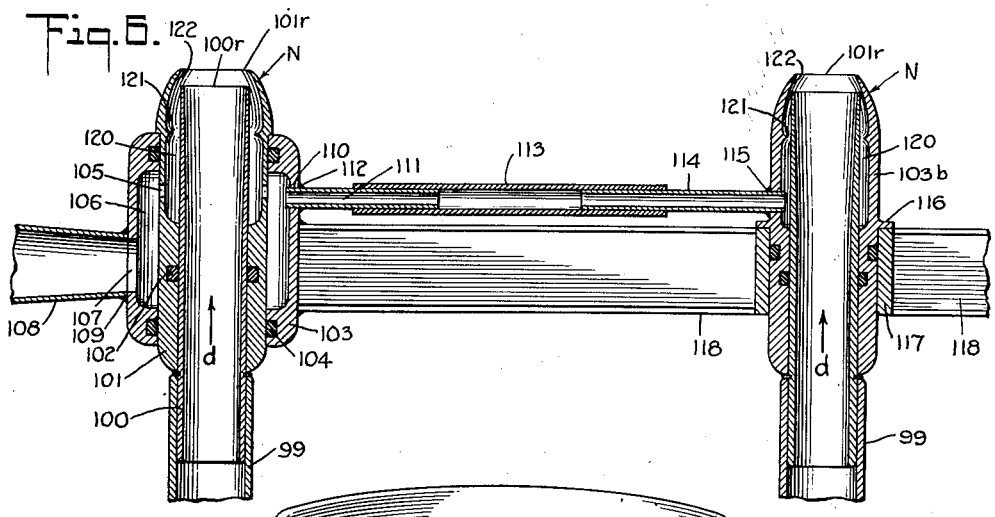
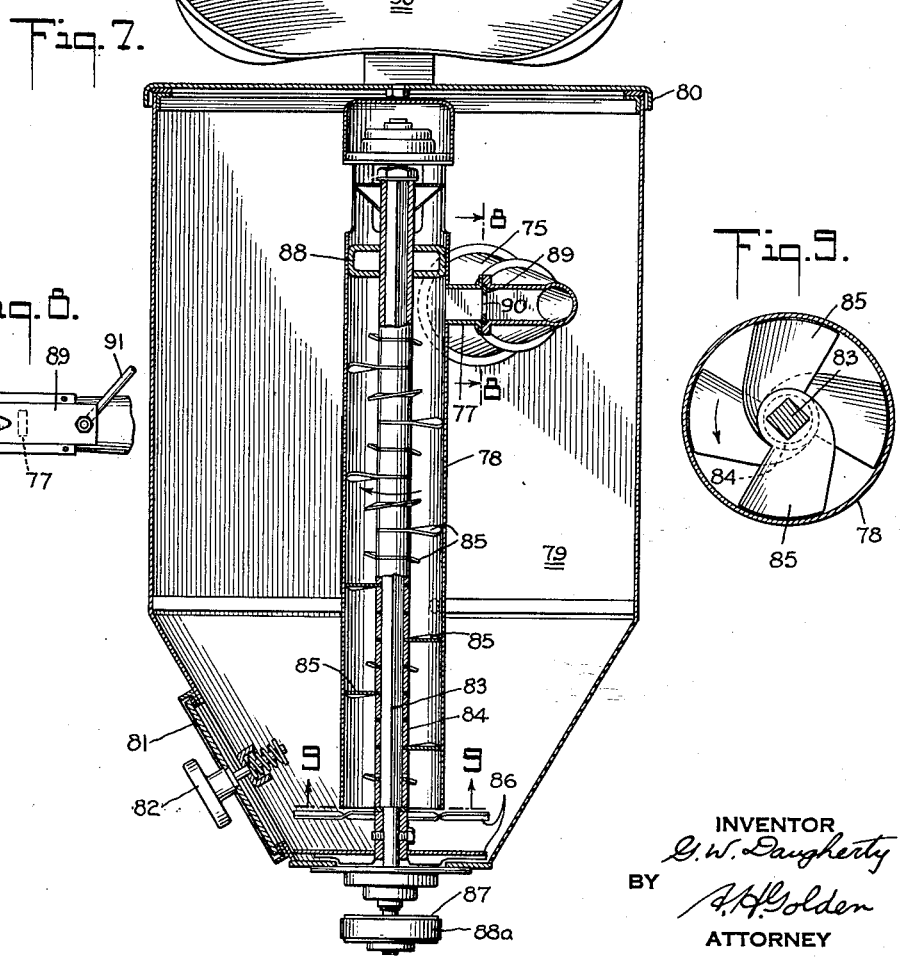
INVENTOR
G. W. Daugherty
BY
H. H. Golden
ATTORNEY Feb. 2, 1954 G. W. DAUGHERTY 2,667,717
SPRAYING AND DUSTING MACHINE
Filed May 21, 1948 5 Sheets-Sheet 5
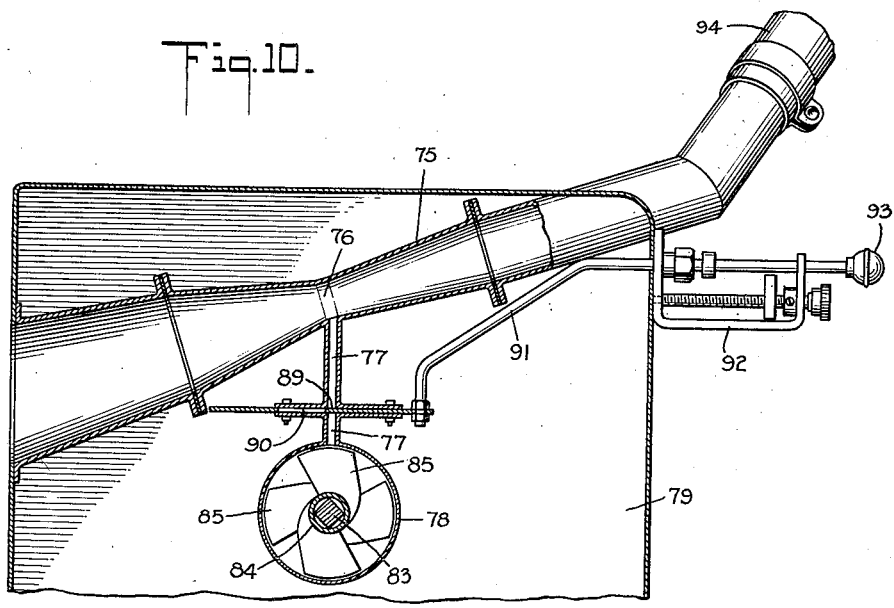
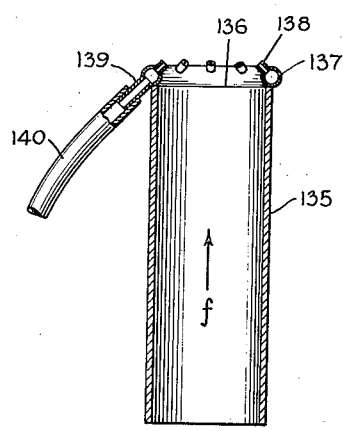
INVENTOR
G. W. Daugherty
BY
H. H. Golden
ATTORNEY Patented Feb. 2, 1954

2,667,717

UNITED STATES PATENT OFFICE 2,667,717

SPRAYING AND DUSTING MACHINE

George W. Daugherty, Orlando, Fla., assignor to Food Machinery and Chemical Corporation, San Jose, Calif., a corporation of Delaware Application May 21, 1948, Serial No. 28,317

2 Claims. (Cl. 43—148)

This invention relates to a spraying and dusting machine of the general type set forth in my Patent No. 2,220,082 issued November 5, 1940. My invention relates also to an improved spraying and dusting machine shown in my patent application Ser. No. 639,949 filed January 9, 1946.

In the spraying and dusting machines I have heretofore conceived, I employ a high volume blast of air that is directed by suitable deflectors toward foliage to be treated, spraying or dusting material being introduced into the air blast at suitable points whereby to be carried by the air blast and deposited on the foliage. Where spraying material is introduced into the air blast, this spraying material is pumped by a low pressure pump to a series of nozzles from which it issues to be picked up by the air blast. Dusting material is usually delivered to the high volume blast of air through a duct leading from a dust hopper or the like.

It is the purpose of the invention of this application to contribute to the art a spraying and dusting machine in which spraying or dusting material, or both spraying and dusting material, may be introduced into a high volume blast of air in such a manner as to better diffuse the dusting and/or spraying material into the air blast. I have found that through the contribution of my invention, I am able to utilize very highly concentrated spraying and dusting materials by diffusing or spreading these materials relatively to the high volume blast of air that I prefer to employ. Also, I am able to spray, to dust, or both to spray and dust. My invention has further objects which will be better appreciated upon a consideration of the features thereof and the results produced thereby.

As one feature of my invention, I utilize a high speed blast of air of relatively low volume for accepting spraying and dusting material and feeding this spraying and dusting material into the high volume blast of air that I employ in my machine. I have found that this high speed blast of air is extremely effective in diffusing spraying and dusting material, thereby making it possible to use highly concentrated spraying and dusting chemicals.

As a further feature of the invention, the blast of air that carries the dusting material is adapted to pick up the dusting material by what I term a Venturi effect and thereby to carry the dusting material into the high volume air blast.

As still a further feature of the invention, spraying material is carried, preferably by a pump, into position to be picked up by the high speed blast of air after the said high speed blast of air has picked up the dusting material. Thereby, it is possible for me to utilize my high speed blast of air for carrying both spraying and dusting material to the high volume air blast. Also, by merely stopping the movement of spraying or dusting material, it is possible to utilize the high speed blast of air for carrying either spraying or dusting material as well as both materials.

A still further feature of my invention resides in the general arrangement of nozzles utilized for determining the points where the high speed blast of air will flow into the high volume blast of air and deliver thereto the spraying and dusting material. As a further feature of this part of the invention, I utilize novel deflectors that are actuated in a novel manner for directing the high volume blast of air toward the foliage.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 4:
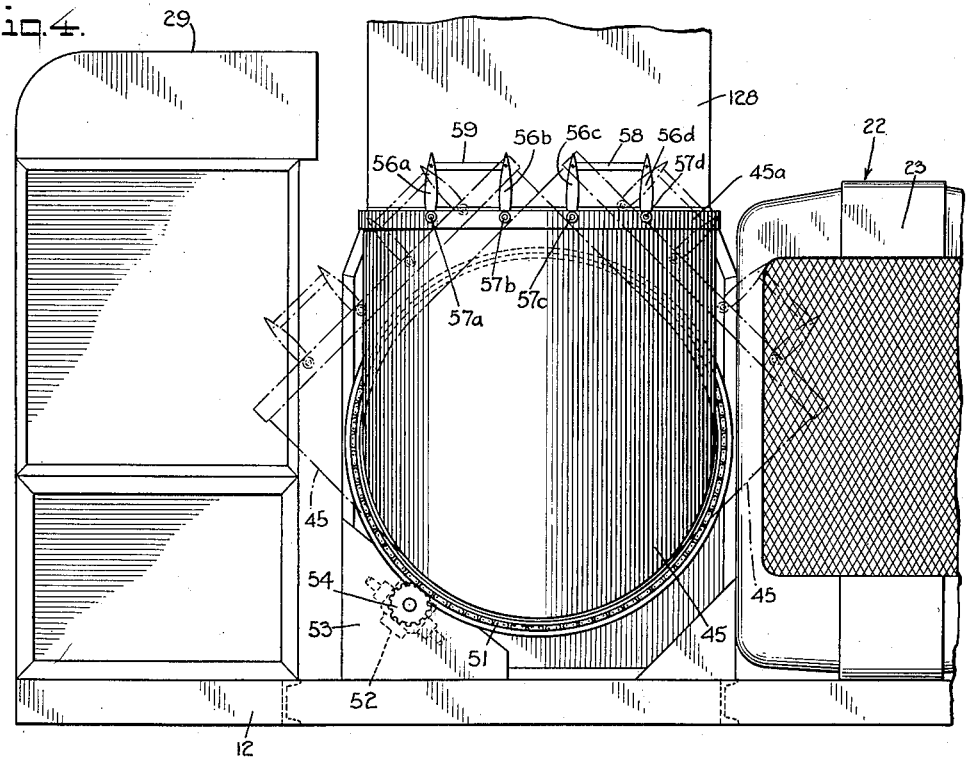
Figure 5:
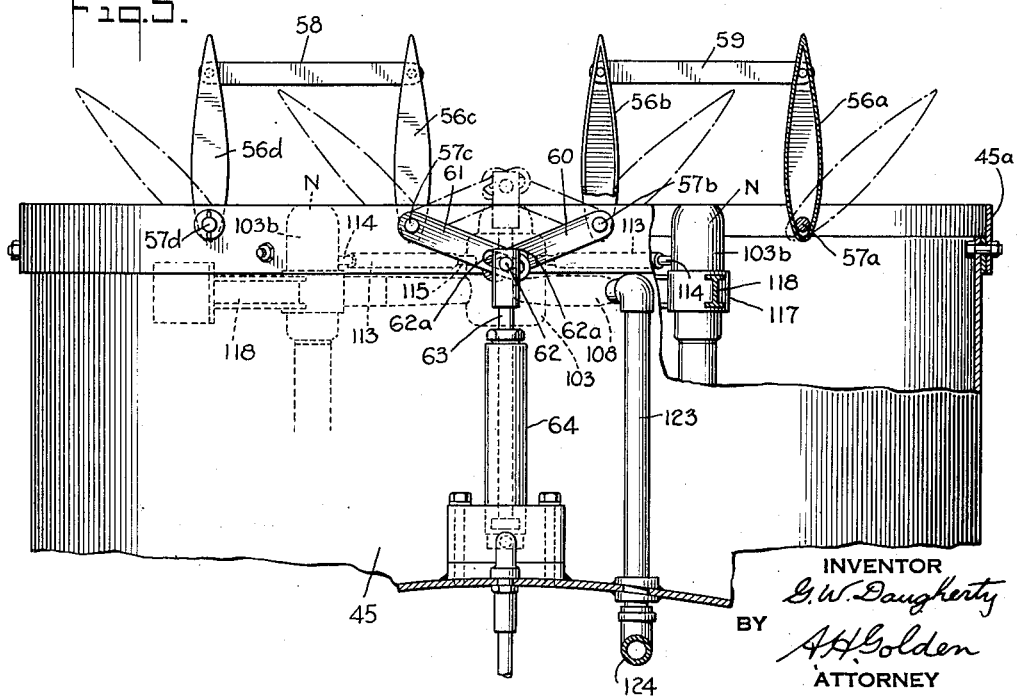

Referring now to the drawings, Fig. 1 is a vertical view of a machine embodying my invention. Fig. 2 is a view looking downwardly on the machine of Fig. 1. Fig. 3 is a vertical section through the machine taken along lines 3—3 of Fig. 2. Fig. 4 is an end view of the machine. Fig. 5 is an enlarged view of the deflectors and the means whereby they are actuated. Fig. 6 is an enlarged view illustrating one form of nozzle utilized by me and is taken along lines 6—6 of Fig. 2. Fig. 7 is a section taken along lines 7—7 of Fig. 2. Fig. 8 is a section taken along lines 8—8 of Fig. 7, while Fig. 9 is a section taken along lines 9—9 of Fig. 7. Fig. 10 is a section taken along lines 10—10 of Fig. 1. Fig. 11 is an enlarged vertical view of a modified form of nozzle that may be utilized in my machine.

Referring now more particularly to the drawings, reference numeral 10 indicates the chassis of a truck or other vehicle supported by wheels 11 and adapted to be pulled by a tractor or to be self-powered, as may be desired. Reference numeral 12 indicates the base frame on which is mounted the apparatus of my spraying and dusting machine and this base frame is pivoted on the axis of a shaft 13, best seen in Figs. 2 and 3, for rotation relatively to the chassis 10. Rotation is imparted to the base frame 12 about the axis of shaft 13 by a hydraulic motor 14 carried by the said base frame. Hydraulic motor 14 rotates a sprocket 15 that actuates a sprocket chain 16, sprocket chain 16 in turn operating a sprocket 17. Sprocket 17 is coaxial and integral with a small sprocket 18 that actuates a sprocket chain 19 extending about a sprocket 20 mounted in the axis of shaft 13. Thus, the several sprockets and chains set forth constitute a double reduction gearing whereby the hydraulic motor 14 effects the rotation of the entire spraying and dusting machine relatively to chassis 10. Of course, other means including manual means may readily be utilized for the same purpose. This part of my invention is not herein claimed and is therefore not shown or described in greater detail.

The base frame 12 of my machine supports at one side thereof an internal combustion engine 22 equipped with the usual radiator 23 and other motor accessories. Motor 22, through a suitable pulley 24, drives a plurality of belts 25. A second pulley designated by reference numeral 26 is also rotated by the engine 22 and actuates, through belts 27, a pump 28. This pump 28 is utilized for developing the hydraulic pressure that is required for actuating a series of hydraulic motors, one of which is the motor 14 discussed above. Incidentally, the several motors and other parts of the machine are preferably controlled from a control panel 29, best seen in Figs. 1 and 2, this control panel being accessible to an operator seated on a seat 30 that is also best shown in Figs. 1 and 2.

It will be recalled that the internal combustion engine 22 drives a series of belts 25 through a pulley 24. These belts 25 extend horizontally as best seen in Fig. 2, through an opening 31 in a dome-shaped member 32 and fit in the grooves of a pulley 33 about which the dome-shaped member 32 fits. Pulley 33, as best seen in Fig. 3, is fixed to a shaft 34 mounted in suitable bearings 35 supported by a pair of upstanding structural members 36 that are welded to a cylindrical sheet metal member 37. This sheet metal member 37 is suitably reinforced and secured to the base frame member 12, and forms part of the air tunnel T of my machine. It will be well at this point to indicate that the drawings show the preferred manner in which I fabricate the structure of my invention, but that the method of fabrication is not particularly important and that the structural parts may be manufactured in many ways that will occur to those skilled in the art.

Secured to the extreme right end of the shaft 34 is the hub 38 of a propeller having a series of blades 39. A cone-shaped sheet metal member 40 is formed substantially as an extension of the dome-shaped member 32 and extends toward the propeller so as to form substantially an extension of the hub 38 thereof. It will, of course, be obvious that the rotation of the propeller 39 will generate a blast of air moving in the direction of the several arrows a in Fig. 3 over the dome-shaped member 32 and the cone-shaped member 40. This air will then move toward a chamber defined by a further cylindrical portion 41 forming an extension of the cylindrical portion 37, and joined thereto by a tapered cylindrical portion 42. It will be understood that the several parts 37, 42 and 41 are all part of tunnel T. Mounted within the tapered cylindrical portion 42 is a series of air straightening fins 43 projecting from a sheet metal dome 44. By the particular arrangement, the blast of air is converted from a ring of air at propeller blades 39 into an mass of air at 41 with a minimum of turbulence because of the functioning of fins 43 to straighten the air blast. The air will then flow to the right in Fig. 3 to enter what I term an elbow 45.

Elbow 45 is fabricated as is well indicated in Figs. 1, 2, and 3, and is adapted for rotation relatively to the cylindrical member 41 of tunnel T to deflect the air blast in any particular direction that may be desired. Incidentally, tunnel T may be made considerably shorter in length than illustrated, if desired.

A series of structural members 46 extend across the end of the tunnel portion 41, and secured to these structural members 46 is a bearing sleeve 47. Through suitable roller bearings 48, bearing sleeve 47 supports a bearing pipe 49 that is integral with structural members 50 secured to one end of the elbow 45. In this way, elbow 45 is rotatable through the bearing pipe 49 relatively to the tunnel T.

For rotating the elbow 45 relatively to the tunnel T, I secure to the outer periphery thereof a sprocket chain 51, as probably best seen in Figs. 1 and 2. This sprocket chain may be welded at spaced points to the sheet metal forming the elbow 45, all as those skilled in the art will appreciate. A hydraulic motor 52, best seen in Fig. 4, is mounted on a gusset plate 53 secured to the base frame 12, and this hydraulic motor is equipped with a sprocket 54 that engages the links of chain 51. Obviously, when the hydraulic motor 52 is actuated, the sprocket 54 will, through its engagement with the links of sprocket chain 51, rotate the elbow 45 into different angular positions relatively to the air tunnel T. In order to guide the air blast moving through the air tunnel into the elbow 45 so that the air blast may move upwardly and through the open end of the elbow 45 as it is pictured in Figs. 1, 2 and 3, I mount within the elbow 45 a series of sheet metal guide vanes 55, all as is best seen in Fig. 3. These guide vanes are exceedingly important and rather efficiently guide the air blast in its movement through the elbow 45. For deflecting the air blast relatively to the elbow 45, I utilize the extremely novel deflectors best illustrated in Fig. 5, but also well shown in Figs. 1 to 4 inclusive.

In the preferred form of my invention, I utilize four deflectors designated by reference numerals 56a, 56b, 56c, and 56d. Each of the deflectors is fabricated from sheet metal with the sheet metal so bent that the deflectors have an air foil shape to present a minimum of resistance to the flow of the air past the said deflectors. Four rods, designated by reference numerals 57a, 57b, 57c and 57d, are supported in spaced relation by the outer rim 45a of the elbow 45, the several deflectors being pinned to these rods for rotation therewith. The upper ends of deflectors 56c and 56d are connected by a metal strip 58, while the upper ends of the deflectors 56a and 56b are connected by a strip 59. Rod 57b is suitably keyed or pinned to a link, while rod 57c is similarly secured to a link 61.

Links 60, 61 are formed with slots 62a through which fits a pin 62 carried by the piston 63 of a hydraulic cylinder 64. This hydraulic cylinder 64 is connected to the hydraulic pump 28 through a suitable control mechanism including manually actuated valves at panel 29. Upon the submission of fluid under pressure to the cylinder 64, the piston 63 is actuated and pivots the several deflectors 56a, 56b, 56c, 56d, as is well illustrated in dash and dotted lines in Figs. 4 and 5. Moreover, this actuation is possible in all positions of the elbow 45 merely by connecting the hydraulic cylinder 64 to the source of hydraulic pressure through a suitable flexible hose, all as those skilled in the art will fully appreciate. The several deflectors 56a, 56b, 56c, 56d are formed with cut-outs 65 as best seen in Fig. 3, these cut-outs serving to allow the movement of the deflectors relatively to nozzles that will hereinafter be described in detail.

Were I to follow the teachings of my earlier inventions in this art, I would introduce spraying or dusting material to the air blast moving through the elbow 45 by providing pipes leading from a dust hopper or a fluid container, the pipes terminating at particular points with relation to the air blast in the manner set forth in my earlier patents and applications. However, as I have already set forth generally, I utilize a high speed air blast for feeding both spraying and dusting material or either spraying or dusting material to the relatively large volume air blast moving through the tunnel T and the elbow 45. I shall now describe just how this high speed air blast is formed and used.

Referring first to Figs. 1 and 2, I show at 66 a further hydraulic motor that is operated by fluid under pressure from pump 28. This hydraulic motor operates through a coupling 67 a shaft 68 having thereon a pulley 69 and a further pulley 70. Pulley 70 drives a vertically extending belt 71 that extends over a pulley 72 fixed to the shaft 73 of a supercharger 74. This supercharger may be of any well-known construction and is adapted to develop a very high speed blast of air. Actually the supercharger that I utilize generates a blast of air that flows at a speed of approximately 200 miles per hour. The air blast thus generated by the supercharger flows through a composite pipe 75 best seen in Fig. 10, and formed through the assembly of a series of pipe sections. One of these sections has a relatively small neck 76 adapted to create a Venturi effect. This Venturi effect is created relatively to a pipe 77, as best seen in Figs. 7 and 10, leading into a feed pipe 78 positioned centrally of a dust hopper 79. Dust hopper 79 is that portion of my machine that supports the seat 30, as is probably best apparent in Figs. 1, 2 and 7. For filling the dust hopper it is possible to remove the seat 30 and therewith cover 80, after which the dust hopper may be filled. An access door 81 is provided for the dust hopper and is readily movable through operation of the handle 82 when it is desired to remove the dust rather than to have it blown through the machine by means to be described presently.

The dust feed pipe 78 has rotatably mounted therein a shaft 83 to which is keyed a series of feed paddles 85 separated by sleeve portions 84. Additional feed paddles 86 are secured for rotation with the shaft 83, these feed paddles being below the feed pipe 78, as that pipe is viewed from Fig. 7. One end of the shaft 83 extends outwardly below the hopper 79 and has secured thereto a pulley 87. This pulley 87 is rotated by a belt 88a extending over pulley 69 which, it will be recalled, is rotatable with shaft 68 by hydraulic motor 66. Therefore, upon suitable actuation of the hydraulic motor 66, the shaft 83 will be rotated and the several paddles earlier described will propel dust upwardly from the bottom of the dust hopper 79 through the feed pipe 78 and towards pipe 77. A limit member 88 will prevent the dust from movement upwardly therebeyond in the feed pipe 78 so that the dust will be made accessible to the pipe 77 and move laterally therein.

For controlling the flow of dust through the pipe 77, I employ a control plate 89 probably best shown in Figs. 8 and 10. Control plate 89 is formed with a triangular opening 90 movable past the pipe 77 so as to control the effective opening of the pipe 77 through which dust may flow toward the composite pipe 75 and Venturi neck 76. Movement of the plate 89 is contributed by a bent rod 91 extending outwardly from the hopper and guided by a bracket 92 for sliding movement relatively to the hopper. For the particular purpose, one end of the rod 91 is formed with a knob 93. Through suitable means carried by the bracket 92, it is possible to lock the rod 91 in any adjusted position. These means are well shown in Fig. 10, but are not described in detail because they are merely exemplary of one form of locking means that may be utilized by me.

It will now be obvious that the high speed blast of air developed by supercharger 74 will move through the composite pipe 75, and because of the Venturi effect at neck 76 will create suction in pipe 77 extending to the dust hopper feed pipe 78. Thereby, the dust moving upwardly in the feed pipe 78 by the several paddles 85 will be caused to flow through the pipe 77 and into composite pipe 75. This flow will be under the control of plate 89, and its triangular opening 90, the plate being positioned by bent rod 91 through knob 93. The blast of air, laden with dust from the hopper 79, will now flow into the air tunnel T through means of additional pipe portions 94 and 95 best shown in Fig. 1, and into a hose 96 shown best in Fig. 3. The hose 96 is preferably of flexible construction and is suitably connected with the bearing pipe 49 so as to form an integral portion therewith. It is, of course, obvious that the dust laden air will flow through the hose 96 into the bearing pipe 49 and toward a further tapered pipe 97 terminating at 98 in a manifold. This manifold 98 is connected by a series of five neoprene pipes 99 to five nozzles positioned at the open end of the elbow 45.

A preferred form of nozzle N utilized by me is shown enlarged in Fig. 6, while another type of nozzle that may be utilized is shown in Fig. 11. I shall first describe the type of nozzle shown best in Fig. 6, and also seen in Figs. 1, 2, 3, and 5.

The central neoprene pipe 99 shown best in Fig. 3 is connected as illustrated in Fig. 6 to a metal tube 100 forming the central air carrying sleeve of the preferred form of nozzle used in my invention. Sleeve 100 has secured thereto an outer sleeve 101 with a suitable gasket 102 therebetween. Actually, sleeve 100 is adapted for sliding movement relatively to the outer sleeve 101 whereby to adjust the position of the outer rim 100r of the inner sleeve 100 relatively to the rim 101r of the outer sleeve 101. Surrounding the outer sleeve 101 is a manifold 103, suitable gaskets 104 being provided between the outer sleeve 101 and the said manifold 103. The outer sleeve 101 is provided with a hole 105, and this hole 105 is in communication with a manifold chamber 106 formed between the manifold 103 and the outer sleeve 101. Manifold chamber 106 is itself formed with an in-take opening 107 in communication with a pipe 108 welded to the manifold 103 at 109. Manifold 103 is further equipped with a series of four openings 110, there being one opening for each of the four outer nozzles N positioned about the central nozzle N and all as is best illustrated in Fig. 2.

Each opening 110 is in communication with a short pipe 111 welded to the outer manifold at 112. Through a suitable neoprene hose section 113, each of the pipes 111 is placed in communication with a pipe 114 welded at 115 to the outer sleeve 103b of each of the four additional nozzles. Sleeve 103b is of substantially the same construction as the outer sleeve 101 of the central nozzle N except that it is equipped with a shoulder 116 adapted to fit about a sleeve 117. Each sleeve 117, one for each of the four outer sleeves 103b of the four nozzles N, is securely welded or otherwise secured to transversely extending support members 118 positioned relatively to the open mouth of the elbow 45 as best illustrated in Fig. 2. The support members 118 are, of course, suitably welded to the metal forming the elbow 45, and in the manner illustrated and described, will support the several nozzle sleeves 103b in position. It will, of course, be understood further that the manifold 103 of the central nozzle will also be supported by the support members 118 in the position illustrated.

Each of the outer sleeves 103, 103b has an inner chamber 120 extending upwardly and terminating in what I call a choking ridge 121, and then extending from this choking ridge 121 into an upwardly tapering surface 122 terminating at outer rim 101r. Actually, the central nozzle receives spraying material through the pipe 108, this spraying material entering through the hole 105 into the chamber 120. Because of the choking ridge 121, the spraying material circulates about the entire 360° of the chamber 120 and then moves between the choking ridge 121 and the inner sleeve 100 toward the rim 101r and outwardly of the nozzle. As the spraying material so flows, it moves along the upwardly tapering surface 122 of the outer sleeve 100, and while so moving, it is acted upon by the air moving in the direction of the arrow d in Fig. 6, the extreme high speed of movement of this air acting to "peel" the spraying material off the surface 122 in extremely small atomized droplets. By moving sleeve 100 relatively to surface 122, the size of the droplets and the amount of spraying material is easily regulated. It should be considered that the air will move in the direction of the arrow *d* at a speed of approximately 200 miles per hour, and at this great speed, it will carry the spraying material therewith in extreme atomized form into the large volume air blast moving out of the elbow 45. Moreover, the air will have previously been laden with dust as was earlier described so that we actually move an effective dispersion of dust and spray laden air into the large volume air blast. I have constructed a machine of the class here described, and it has demonstrated the great utility of this method of introducing both dusting and spraying material into a high volume air blast.

Pipe 108 receives spray material, as best illustrated in Fig. 1, from a further pipe 123 in communication through a neoprene hose 124 with a control valve 125 receiving spray material from a hose 126 extending from a pump 127. Pump 127 is in suitable communication with a spray material containing tank 128 carried by the machine. The four peripheral nozzles N are supplied with spraying material from the central manifold 103 through the pipes 111, 113 and 114 which were earlier described. The peripheral nozzles receive their air and dusting material from the outer neoprene pipes 99 in exactly the same manner as the central nozzle and the action of these peripheral nozzles is in all other respects, the same as that of the central nozzle.

It will be well at this point to indicate that merely by shutting off the supply of spraying material, it is possible to issue dust alone into the large volume air stream moving through elbow 45. Conversely, it is possible to cut off the flow of dusting material into the high speed air blast moving into the several nozzles so that spraying material alone will move into the large volume air blast. Thus, my machine makes it possible either to spray or to dust, or both to spray and dust simultaneously. It will be well also to indicate now that it is the function of the cut-outs 65 in the several deflectors 56*a*, 56*b*, 56*c*, 56*d* to allow movement of the deflectors, the cut-outs merely fitting about the several nozzles as will be quite apparent.

Referring now to Fig. 11, I show there a nozzle that may be substituted for each of the nozzles N heretofore described. Thus, I can use merely a sleeve 135 through which the air blast moves in the direction of the arrow *f* toward the outer rim 136, the air being supplied thereto by one of the five hose 99. This will be the same air blast that moves in the direction of the arrows *d* in Fig. 6. At the outer periphery of the sleeve 135 there is mounted a circular pipe section 137 equipped with a series of nozzles 138 formed by the welding to the circular pipe 137 of a series of short tube sections. A short in-take pipe section 139 will also be welded to the ring 137, and through a neoprene hose 140, spray material will be supplied to the ring 137 from the pump 127 heretofore described. It will now be obvious that air and dusting material will move through the sleeve 135 and will pick up spray material from the ring 137 and the nozzles 138.

At this point it will be well to refer generally to some of the parts of the machine that have not heretofore been described and which are not part of the machine herein claimed. Thus, the machine not only includes the spray material tank 128 equipped with a usual filler cap 129 and screen 130, but has also a tank 131 for hydraulic fluid used in the operation of the several hydraulic motors that have heretofore been referred to. The machine also includes controls for the several hydraulic motors, valves, and other parts which are all adapted for manipulation by the operator on the seat 30 as has been indicated generally. For protecting the operator and for preventing injury to the propeller blades 39, the in-take end of the air tunnel is equipped with a screen 132 in the manner that I have made standard in this art.

I believe that the operation of my invention and its great effectiveness will now be clearly understood by those skilled in the art.

I now claim:

1. An insecticide spraying and dusting machine comprising a support, a supply source for insecticide dust, a supply source for insecticide liquid, a duct of one size extending from the dust supply source to an end of the support to effect a dust stream, a pipe communicating with the interior of the duct and with the liquid supply source to effect a liquid stream, a conduit of several times greater cross sectional area than the said duct and pipe surrounding the ends of said duct and pipe, means for providing an air stream to pass through the conduit, said air stream adapted to encompass the stream of material blowing from the duct and pipe, a supercharger on said support providing a blast of air within said dust duct, and a pump for forcing said liquid in said pipe to pass to and intermingle with said combined dust and air stream, said combined dust, air and liquid stream being discharged toward foliage at a greater distance and over a greater area by said air stream in said conduit, said blast of air being at such speed as to effect substantially complete separation of the dust particles from each other and substantially complete intermingling of the dust particles and liquid insecticide in said air stream.

2. An insecticide spraying and dusting machine comprising a support, a supply source for insecticide dust, a supply source for insecticide liquid, a duct of one size extending from the dust supply source to an end of the support to effect a dust stream and terminating in a nozzle, a pipe communicating with the interior of the nozzle and with the liquid supply source to effect a liquid stream, a conduit of several times greater cross sectional area than the said duct and pipe surrounding the ends of said duct and pipe, means for providing an air stream to pass through the conduit, said air stream adapted to encompass the stream of material blowing from the duct and pipe, a supercharger on said support providing a blast of air within said dust duct, and a pump for forcing said liquid in said pipe to pass to and intermingle with said combined dust and air stream at said nozzle, said combined dust, air and liquid stream being discharged toward foliage at a greater distance and over a greater area by said air stream in said conduit, said blast of air being at such speed as to effect substantially complete separation of the dust particles from each other and substantially complete intermingling of the dust particles and liquid insecticide in said air stream.

GEORGE W. DAUGHERTY.

References Cited in the file of this patent

UNITED STATES PATENTS

| Number | Name | Date |
|---|---|---|
| 780,832 | Storer | Jan. 24, 1905 |
| 1,503,159 | Haywood | July 29, 1924 |
| 1,749,504 | Pelton | Mar. 4, 1930 |
| 1,785,932 | Brown et al. | Dec. 23, 1930 |
| 1,832,963 | Burger | Nov. 24, 1931 |
| 1,880,781 | Cairns | Oct. 4, 1932 |
| 2,040,452 | Troller | May 12, 1936 |
| 2,157,630 | Root | May 9, 1939 |
| 2,220,082 | Daugherty | Nov. 5, 1940 |
| 2,232,670 | Barrett | Feb. 18, 1941 |
| 2,302,925 | Von Schlippe | Nov. 24, 1942 |
| 2,315,096 | Sanderson et al. | Mar. 30, 1943 |
| 2,335,508 | Gustafsson et al. | Nov. 30, 1943 |
| 2,545,829 | Spreng | Mar. 20, 1951 |

FOREIGN PATENTS

| Number | Country | Date |
|---|---|---|
| 225,094 | Great Britain | Nov. 27, 1924 |
| 586,804 | Great Britain | Apr. 1, 1947 |
| 588,592 | Great Britain | May 28, 1947 |